United States Patent [19]

Gangi

[11] Patent Number: 4,761,973
[45] Date of Patent: Aug. 9, 1988

[54] WARP KNITTING/CROCHET WARP KNITTING MACHINE

[76] Inventor: Richard Gangi, 270 Johnson Ave., River Edge, N.J. 07661

[21] Appl. No.: 47,272

[22] Filed: May 8, 1987

[51] Int. Cl.⁴ .............................................. D04B 23/00
[52] U.S. Cl. ........................................ 66/204; 66/207
[58] Field of Search ........................... 66/207, 203, 204

[56] References Cited

U.S. PATENT DOCUMENTS

| | | | |
|---|---|---|---|
| 3,762,184 | 10/1973 | Schur et al. | 66/205 |
| 4,653,293 | 3/1987 | Porat | 66/207 |

FOREIGN PATENT DOCUMENTS

| | | | |
|---|---|---|---|
| 2349931 | 2/1973 | Fed. Rep. of Germany | 66/204 |
| 2157720 | 10/1985 | United Kingdom | 66/203 |

*Primary Examiner*—Ronald Feldbaum
*Attorney, Agent, or Firm*—Arnold D. Litt

[57] ABSTRACT

The guide bars of a warp knitting/crochet warp knitting as well as the plurality of needles associated with such machines are automatically fully controlled for each full reciprocal movement in the knitting cycle of said machines. The pattern bars, yarn guides and needles are all moved in synchronism with each other and the rotation of the main machine drive to generate various desired patterns through a programmable memory with the capacity to store all the information required to position all the pattern governing parts in a series of juxtapositions which produce the desired patterns in the cloth fabricated by said machine. Said programmable memory means is integrated with a signal processing means generating signals which control the rotation of Servo-Motors; direction of the rotation of said Servo-Motors; rate of rotation of said Servo-Motors; and duration of each said series of rotations. Said Servo-Motors are directly and rotably connected to the pattern bars of said machine in a direct manner in such a way that each said Servo-Motor is directly and integrally connected to its individual pattern bar by means of a screw bolt or a Moglese nut and Acme screw so that the reciprocal movement of the pattern bar is directly controlled by the clockwise or counter-clockwise movement of the Servo-Motor associated with each such pattern bar. The position of each of the elements which must interact in synchronism with each other is determined by an optical sensor integrated into each Servo-Motor. The position of those elements directly controlled by the Servo-Motor is transmitted directly to the controlled elements associated with the programmable memory. The time within which the control element means may operate is determined by feedback from a magnetic switch which is integrally connected to said knitting machine's main rotating shaft.

14 Claims, 7 Drawing Sheets

WARP KNITTING/CROCHET WARP KNITTING MACHINE

BACKGROUND OF THE INVENTION

The patterns produced in the cloth generated by Automatic Warp Knitting Machines and/or Crochet Warp Knitting Machines are dependent on the movement of pattern bars. In all instances, the pattern bars rest at one end against a cam or a cam-like device. Contact is maintained against the cam or cam-like device or push rod by the use of spring tension to maintain the mechanical interfacial contact between the pattern bars and the push rod or cam or cam-like device. The contours of the cam or cam-like device constitute the encoding means by which the reciprocal motion of the pattern bars is controlled to generate the desired pattern in the cloth. In some instances, a computer or computer-like device has been substituted for the cam or cam-like device, but even in those instances, the return cycle of the reciprocating pattern bar is determined by spring loaded tensions. Therefore, in all cases, the force required to move the pattern bars is increased by the force required to tension the spring. Conversely, the spring tension increases the frictional force required to move the cams or cam-like devices on the return stroke of the reciprocal motion of the pattern bars. Some Automatic Warp Knitting/Crochet Warp Knitting Machines have substituted computer controlled stepping motors to activate the push rods instead of the cams or cam-like devices. However, this type of machine still operates against spring tension as stated above throughout the entire reciprocal stroke of the pattern bars. In all such machines, the pattern bars must be of substantial mass in order to be stable against the friction caused by the spring loaded tension.

The cams, or cam-like devices, are the encoding means by which the knitting machine is programmed to produce a specific cloth pattern. The cam-like devices are chains which are driven by a sprocket-type drive, to which shapes are attached. These shapes act as cams and through the medium of the push rods and springs cause the pattern bars to follow a prescribed reciprocal motion on a repetitive program in direct mechanical synchronism with all the other associated mechanical parts, such as the needles, yarn guide tubes, yarn guide tube lifting bars and the machine's main shaft. The cams perform exactly the same function as the cam-like devices except the pattern is in the form of one integrated shape instead of a plurality of shapes attached to a chain and sprocket drive. Whether the encoding is accomplished through the use of a cam, or a cam-like device, the actual encoding takes a large number of manhours to accomplish. Where the reciprocal motion of the pattern bars is controlled by a programmed computer, the ubiquitous spring tension requires heavier members, higher torque and therefore, higher moment of inertia, all of which complicate the control problems for the pattern bars and also increase machine vibration and machine wear.

The ball screw/ball nut arrangement which is rotably attached to the shaft of the stepping motors in such a manner as to convert the rotational movement of the motor drive shaft into the reciprocating motion of the push rods also have to be of considerable mass. The mass requirements are necessary since there is always load on the system from the spring loading of the pattern bars. The constant spring tension causes a varible load to exert on the pattern bars in that as the pattern bars are driven away from the cam end of the machine, the drive mechanism must not only work against the mass of the pattern bar assembly, but, also against the tension of the springs which load increases according to the stress applied according to Hooke's Law. Therefore, the highest ratio of mechanical loadings occur when the push rods are pushing against the pattern bars and the springs. The lowest ratio of mechanical loadings occur when the cams or cam-like devices allow the push rods to retreat from their extended position down the relief side of the cam.

The differences in the mechanical loading affect the system insofar as the rate of extension of the pattern bars is compared to the rate of retreat down the relaxed side of the cam. This leads to a different rate of extension versus the rate of retreat. Since the rest of the machine is still operating at a standard speed and the pattern bars move perpendicularly to the warp threads of the machine, an anisotropic pattern must be and is produced in the cloth, at all times, as an uncontrolled function.

The present invention, when running at a constant speed, produces a completely uniform cloth. There is no anisotropy present. The rate of the extension stroke is substantially the same as the rate for the retreating stroke. The new machine runs quietly without vibration and its attendant wears. The new machine can function well with lower torque drive motors with lower moments of inertia. The mass of the pattern bar assemblies can be lighter than on the conventional machine. This machine eliminates the need for a spring loaded return or retreat cycle; eliminates the spring loaded interface between the push rods and the pattern bars; and eliminates an element of the machine known as the guide tube lifting bar. This element is present in other machines to remove the tubes which guide the yarn to the needles which knit the cloth and its purpose is to prevent the knitting needles, guide tubes and yarn from getting entangled when the machine indexes to the location for the next series of knitting stitches required by the pattern being produced by the machine. The elimination of the return springs, cams or cam-like devices, push rods, guide tube lifting bars and vibration all allow the new machine to operate at a greater number of cycles per unit time. The elimination of vibration together with the more precise control of the action and position of all the active members of the new machine has increased the range of versatility and utility of the machine since this machine can utilize knubbly yarns such as boucles, or novelty yarns such as sequin strings.

SUMMARY OF THE INVENTION

The present invention operates the pattern bars of an Automatic Warp Knitting Machine and/or a Crochet Warp Knitting Machine by using the direct connection between the main driving means for the pattern bars and the pattern bars for each said machine. The main shaft of a Servo-Motor is directly connected to the pattern bars by a mechanical means which changes the angular rotational movement of the Servo-Motor to the reciprocating movement of the pattern bars. The mechanical coupling between the threaded shaft driven by the Servo-Motor and the pattern bars is accomplished through the use of screw bolts rigidly attached to the pattern bar and rotably attached to the threaded shaft driven by the drive shaft of the Servo-Motors. The mechanical coupling means may also be a so-called Molgese nut and Acme screw in either of the two preferred embodiments. Since the reciprocal motion or oscillation of the pattern bar is controlled directly by the mechanical coupling means and the clockwise or counter-clockwise rotation of the Servo-Motor, there is no need to use spring tension to effect the return stroke of the pattern bar. The low mass and the corresponding low moment of inertia of the Servo-Motors and the associated pattern bars of the Warp Knitting/Crochet Warp Knitting Machines allows for a very fast response time in the changes in direction of the pattern bars to conform to the requirements of that design of the cloth being generated by the knitting machine with a minimum of lag time.

A programmable micro-processor controls the position of the pattern bars by controlling the direction of the Servo-Motor's rotation and the time of rotation at constant speed to establish the position of the pattern bars. The control signals of the programmable microprocessor perform the function of the cam or cam-like device which is the programming means in conventional Automatic Warp and/or Crochet Warp Knitting Machines. The programming in this invention is accomplished through the use of a standard computer key board. The computer program takes the place of the pain staking and time consuming task of designing cams or cam-like devices, fabricating the shapes and assembling and/or integrating them into the knitting machine. The position of all the parts of the knitting machine which must operate in synchronism is made known to the micro-processor through the use of position determining sensing means which, in the preferred embodiment, are magnetic switches, optical sensors, shaft encoders and limit switches. The pattern bars perform the function of presenting yarn to the knitting needles which are associated with a specific warp thread. The yarn is guided to the needles by tubes attached to the pattern bars. The response time of the machine which is the subject of this innvention is so rapid that the machine has dispensed with the necessity for having a "tube guide lift bar" which is used in other machines to clear the area of cloth generation when the machine indexes to generate the next line in the predetermined pattern.

The mechanical coupling means overcomes the erratic movements present in the prior art systems in the following ways: In the prior art, the reciprocal motion is controlled by springs. The springs are subject to fatigue, change in elasticity and change in rates of extension and recoil under a given load. Since springs work against a friction load on the cam shaft and the ubiquitous load of gravity, and since the pattern cams are subject to varying loads, the reciprocating displacement of the pattern bars occurs at varying rates of displacement from one side of the cam to the other and from one cam lobe to another. The present invention completely eliminates the erratic displacement of the pattern bar associated with spring activated return cycles through mechanical coupling means, i.e., close fitting bolt and nut arrangement. For any given thread configuration, the angular displacement of the drive motor will produce exactly the same positive or negative reciprocal displacement of the pattern bars and the rate of displacement of pattern bars is directly controlled by the speed of rotation of the drive motors.

The Servo-Motor turns in a 1:1 ratio with the main drive shaft of the pattern bars of the knitting machine. The sensor means functions by essentially controlling the location of all the mobile cloth generating parts of said knitting machine, so that any change of the existence of an out of synchronization condition at any operational speed of said machine is greatly minimized. Out of synchronization conditions are a function of spring tension and are generally most prevalent during start-up and slow down to stop phases of machine operation. In conventional type knitting machines, said out of synchronization operation generally results in damaging collisions between parts such as the actual knitting needles and/or the needles and the tube guides which position the yarn into the proper juxtaposition to the knitting needles and warp threads. Each such collision is expensive to repair and time comsuming.

When it is either impossible or impractical to use a knitting machine with low mass or low moment inertia components, the present invention can be modified to perform well under those aforesaid conditions. The high mass, high moment of inertia version of this invention is the same as the invention previously described, except for modifications to the Servo-Motor and the ball screw/ball nut. The Servo-Motor turns only in one direction, in synchronization with the pattern bar's main drive shaft as described above. This embodiment uses two push rods (one with a right-handed screw and one with a left-handed screw), both connected to the same face plate into which the pattern bar or moving pattern generating member is affixed. Each threaded rod is connected to its own synchronized motor and the reciprocal movement is produced by switching the drive power between the motor driving the right-hand screw to the motor driving the left-hand screw in the sequence determined by the controlling means.

The position of the pattern bar in relation to the rest of the structure of the apparatus is determined by a sensing means which is turned in synchronization with the main drive shaft. This synchronization device may be attached to the main power drive motor *or* to the threaded rod which is mechanically connected to the pattern bar or to other cloth generating elements of the apparatus. In the preferred embodiment, the position determining sensing device is attached to the threaded rod instead of the main drive shaft of the drive motor so that it rotates in a 1:1 ratio with the threaded rod and eliminates any slight differences in the position of the pattern generating units connected to it, since any errors in position caused by play or stretching of the drive means is thus bypassed.

The computer may be used to control a plurality of pattern bar drive motors. Each pattern bar is driven by its own individually controlled drive motor.

DETAILED DESCRIPTION OF THE DRAWINGS

Figure 1:
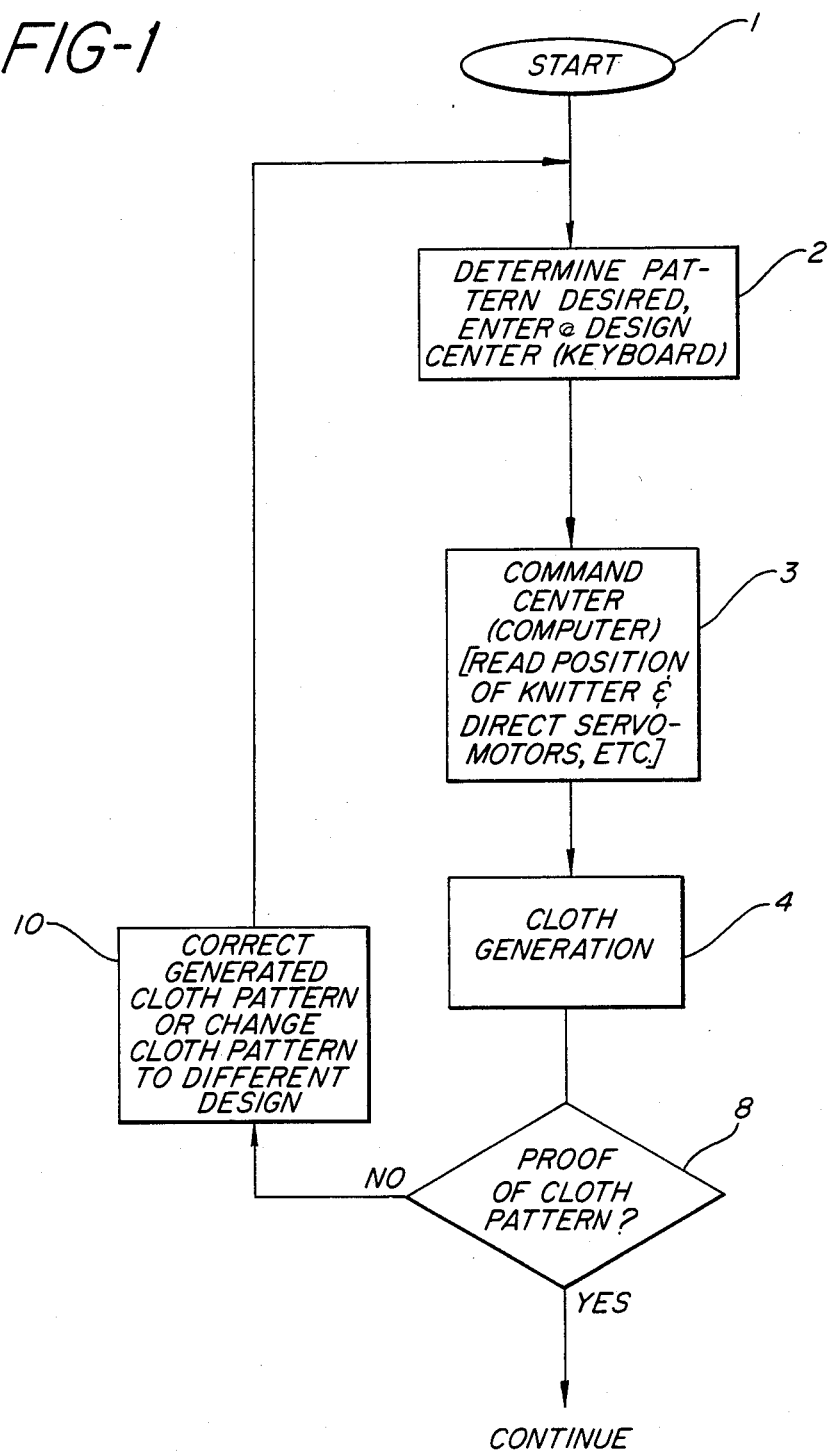
FIG. 1 is a flow diagram showing the relationship between the computer control and the knitting machine and the method by which the commands and decisions are made in the process of cloth generation.
Figure 2:
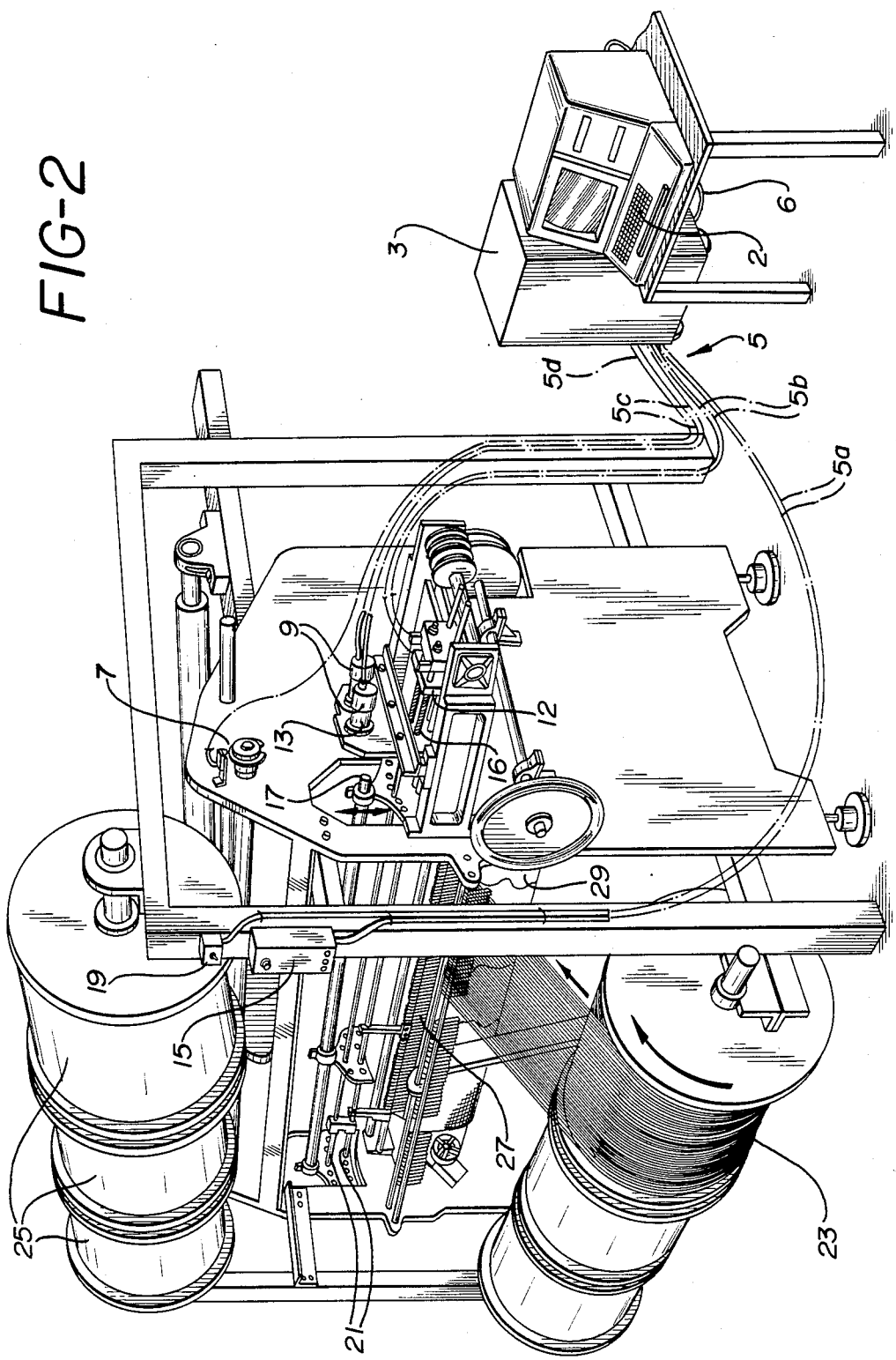
FIG. 2 is a perspective view of the knitting machine showing the computer driving means.
Figure 3:
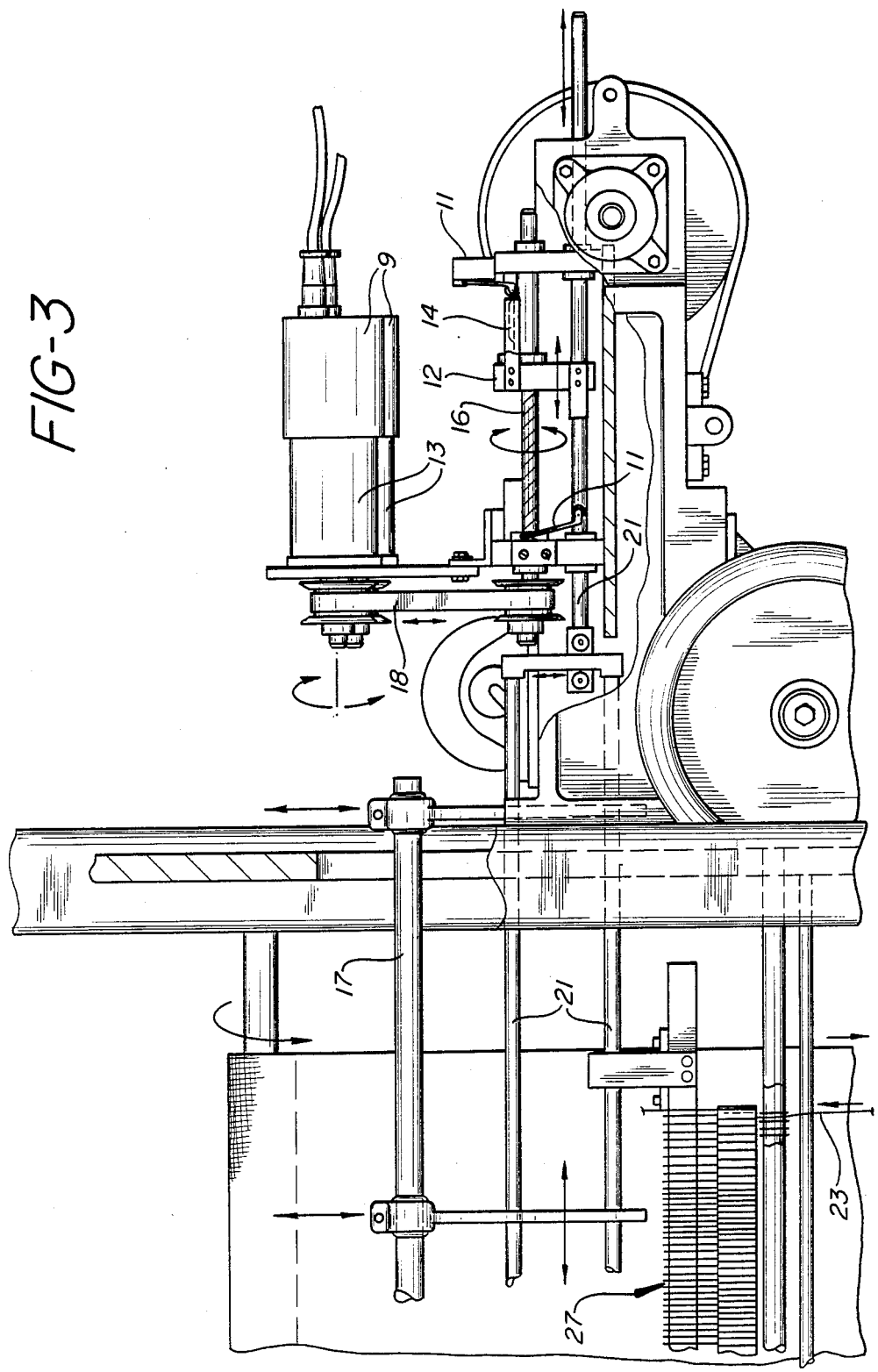
FIG. 3 is a side view showing the mounting of the Servo-Motors, ball screw and ball nut, the tube guides, pattern bars and the knitting needles.
Figure 4:
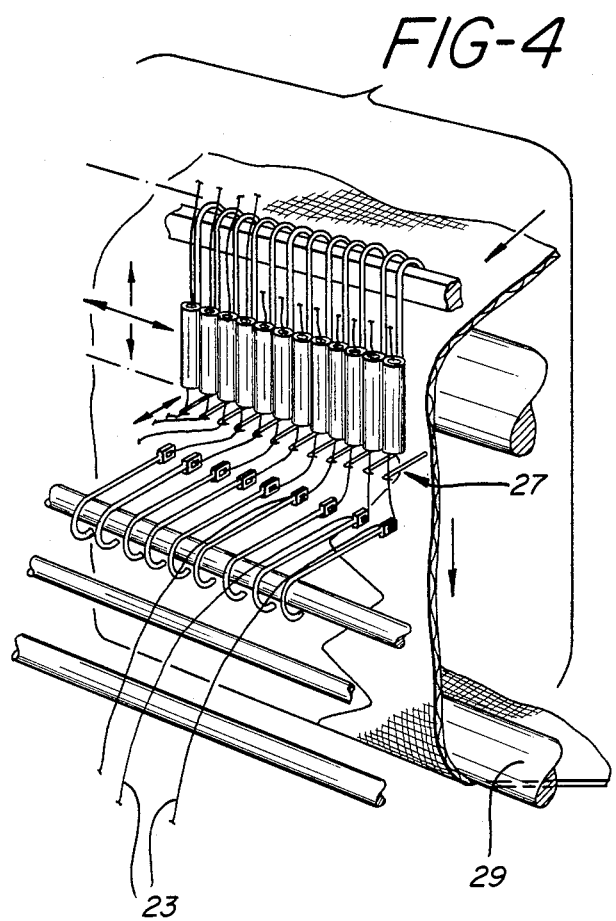
FIG. 4 is a perspective view showing the pattern bar, knitting needles, tube guides and the generated cloth.
Figure 5:
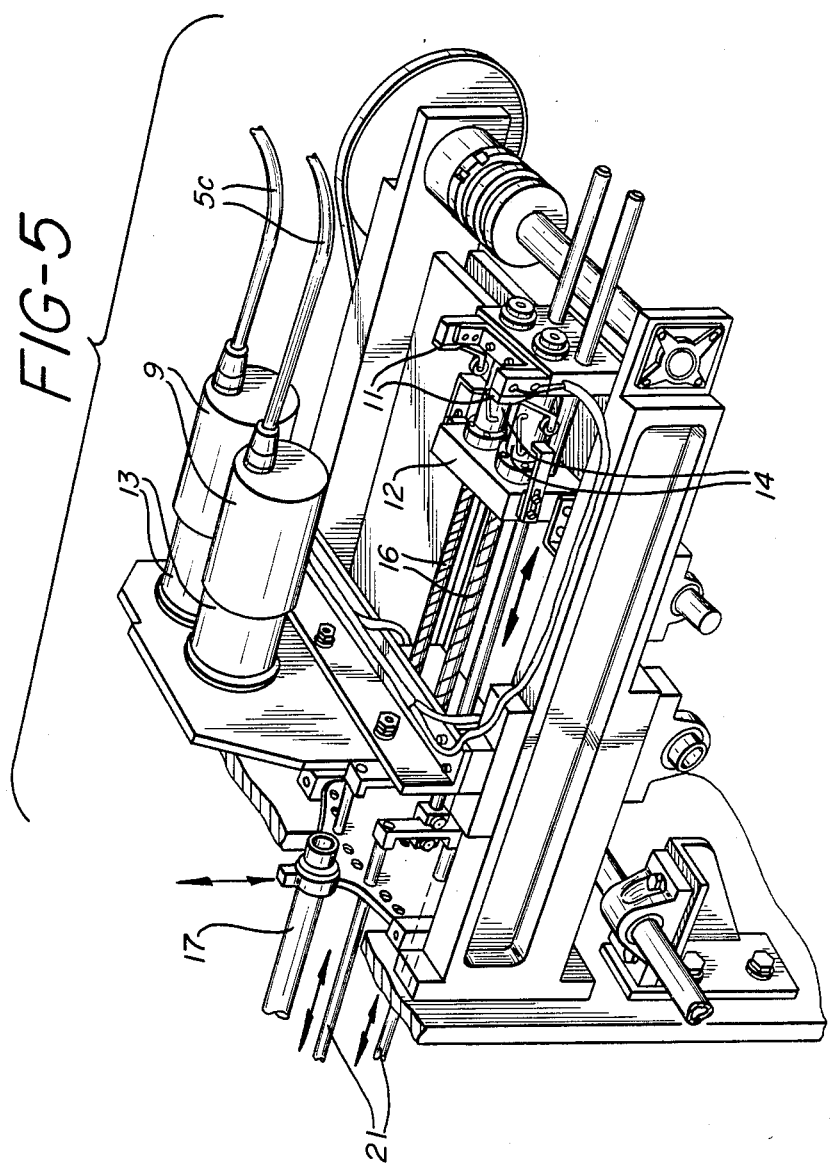
FIG. 5 is a perspective view showing the mounting of the Servo-Motors, ball screws, ball nuts and the direction of movement for the components.

With reference to FIG. 1, initially, the decision is made to use the machine, 1, and to turn on the programming means. Keyboard, 2, is used to input a program respecting the desired pattern into the computer. Computer, 3, illustrates the functions which are controlled by the computer once it has been programmed to the specifically desired cloth pattern. This includes the determination of the position of the pattern-generating elements and the control signals to the Servo-Motors in relationship to the pattern and to the position of the cloth-generating elements of the apparatus. The cloth-generating process, 4, is then commenced for a sufficient time to examine the cloth pattern produced by the data originally placed into the computer control. After the run of specific pattern is completed or after examination of an initial pattern, 3, the determination is made to continue with the existing pattern or to correct it or to change it, 10, to a completely new pattern.

With reference to FIGS. 2, 3, 4 and 5, a description of a preferred embodiment of the invention may be obtained. Communication between the various sensing and control devices on the cloth-generating apparatus and the computer is accomplished by means of electrical cables, 5. The on/off function is communicated along cables, 5a. The output of the limit switches is communicated along lines 5b. The input and output which controls the Servo-Motor pattern bar drive is communicated along lines 5c. The output of the magnetic switch, 7, is communicated along line 5d.

The required parameters to determine the pattern of the cloth generated are entered into the computer, 3, by means of programming input means, 2. Signals are communicated between the programming unit and computer by way of interface cable, 6. The magnetic switch, 7, determines the time window within which the computer controls are activated. During the time the computer controls are activated, the exact position of the pattern bars is determined by the shaft encoders (optical sensors), 9. The shaft encoders convert angular rotation of the drive motors into the horizontal movement of the pattern bar by means of an intercom function and a sensor which determines the relative position of the drive shaft. The drive motors, 13, rotate in a one-to-one ratio with the threaded rods, 16, by means of drive belts, 18. The full excursion of the reciprocal motion of the pattern bar assembly is controlled by limit switches, 11, located at the boundaries of the reciprocal motion. The threaded rods, 16, are mounted into a face plate, 12, by means of the rotable coupling devices, 14. The entire system is activated by the on-off switch, 15. An optional tube guide left bar is shown as, 17. Its purpose is to assist in moving the pattern bar which contains the tube that guides the threads out of the path of the moving knitting needles.

The power down-switch, 19, aids in preventing needle damage at times when the rate of operation of the machine must be reduced. This is accomplished by maintaining the synchronization between the drive motors and the operating needles. The cloth pattern is generated by the predetermined reciprocal motion of the pattern bars, 21. The knitting yarn is supported by warp threads which are unrolled from drums of thread, 23. Knitting yarn is fed down through the tube guides from above where it is also contained on drums, 25. The actual cloth is generated by the needle array, 27. The finished cloth is taken up on take-up rollers, 29.

While the shaft encoder sensors are shown as being directly attached to the drive shaft of the main drive motor for the pattern bars, a preferred embodiment would have the shaft encoders mounted on the block in which the main drive rods turn, whereby the shaft encoder sensor turns on an absolute one-to-one ratio with the threaded rod.

Figure 6:
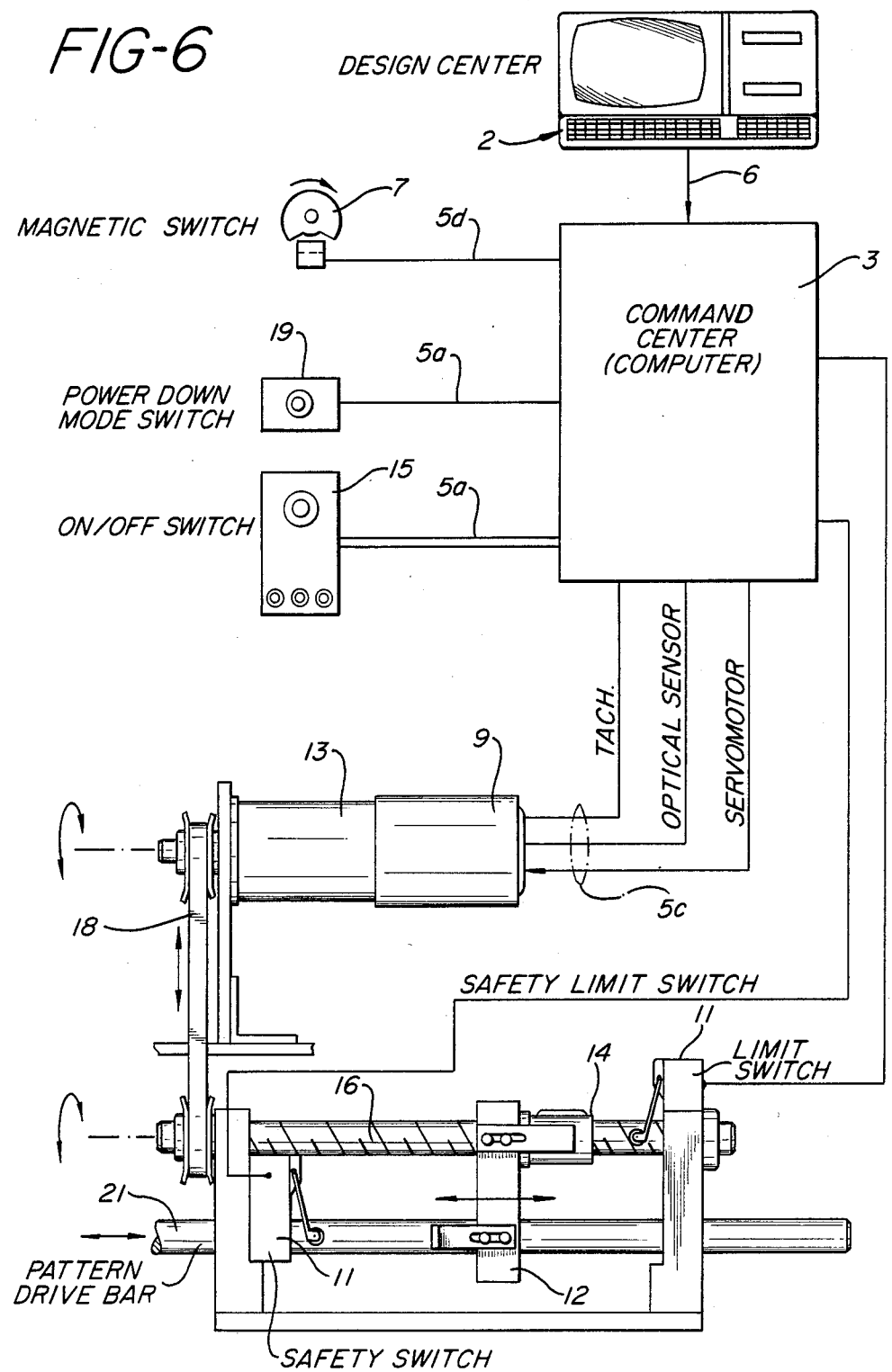
FIG. 6 is a flow diagram showing the sensing and control elements which are associated with the operation of the invention.

The operation of the machine can be best understood by referring to FIG. 6. The encoding information for any specific cloth is fed into the system at 2, the so-called design center or programming access to the computer. This design center is the functional equivalent of a mechanical engineer designing a set of cams or a chain of cams to control the pattern of the required cloth. The pattern information is then sent to the computer command center or the computer, through the interface, 6. Cable 6, an electronic connection between 2 and 3 is the equivalent of the pressure interface between the cams and the push rods for the pattern bars in the prior art. The command center or the computer processes the information from the various sensors, i.e., the limit switches, the optical sensors, the Servo-Motors. The rotation and the position of the pattern bar is then controlled relative to the other operating components of the cloth generating machine to produce the desired pattern. This is equivalent to the cams pushing the pattern bars against a spring load in the prior art. The rotable coupling device, 14, which is basically a bolt and nut arrangement performs the function of the cams in extending the pattern bars in one reciprocal direction and the springs in returning the pattern bars in the other reciprocal direction. There are several variations on the threaded rod and nut arrangement, one of which is the Acme bolt and screw which is well known in the industry and the another, a device called the Moglese nut. Both of these devices provide smooth acting, tightly controlled, threaded interfaces between rotating devices and linear motion converted directly from that rotating motion.

Figure 7:
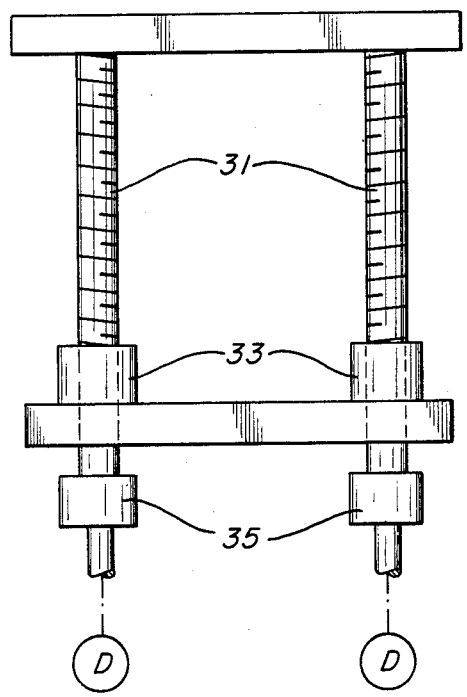
FIG. 7 is a schematic top plan view showing an alternate configuration of the invention where two (2) drive motors are used.
Figure 8:
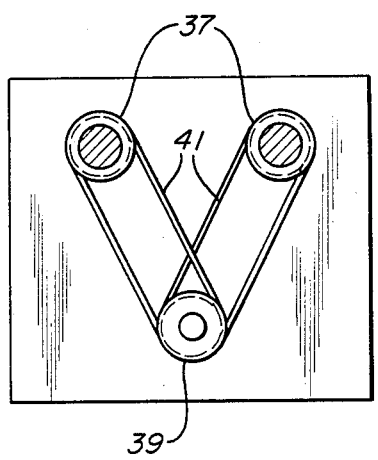
FIG. 8 is a view of the driving assembly showing an embodiment of the rotation reversal mechanism.

The driving means for the alternate form of this invention is illustrated by FIG. 7. There are two (2) threaded rods, 31, with opposite screw directions; one being left-handed and one being right-handed. The screw bolts or Moglese nuts, 33, ride on the threaded rods, 31. The threaded rods are rotably connected to the driving means through a magnetic cluth, 35, one cluth for each threaded rod, 31. FIG. 8 illustrates an embodiment of how the direction of the threaded rods is controlled so that the following rod and the driving rod maintain the relative position of the screw bolts or Moglese nuts. Pulleys, 37, are attached to the ends of the threaded rods. An additional pulley is situated with two (2) tracks so that the belts from the pulley on the drive threaded rods goes to the idling pulley, 39. The connecting belts are shown as 41. The magnetic clutch on the driving rod is engaged at the same instance the magnetic clutch on the following rod is disengaged. The engagement and disengagement of the magnetic clutch coupled with the reversing mechanism creates the reciprocating motion for the pattern bar.

The motion may also be caused by using one heavy-duty motor which is by a gear train wherein the threaded rods are driven by one motor through the gear train. The threaded rods rotate in the required direction caused by the engagement and disengagement of magnetic clutches connected to the reversing pulleys as discussed earlier. In this embodiment, the shaft encoders may be mounted directly on an extension of the shaft on the threaded rod magnetic clutch assembly so that any backlash in either the belt assembly or the gear train will be eliminated and the position of the pattern bar can be more accurately ascertained since the shaft encoder which determines the location of the pattern bar is connected directly to the driving rod mechanism.

The controls for both versions of this invention allow for varying the speed with which the pattern bars travel. This varying speed allows the introduction of another design factor as to the cloth, the production of more diverse and interesting patterns in the finished cloth product, which patterns are produced by computer programmed and generated anisotropy.

More precise control of the position of the pattern bars is achieved in any configuration of this invention by connecting the threaded rods directly to the sensing device thus eliminating any errors in positioning which could be introduced by the backlash in the coupling train or pulleys between the driving means and the threaded rods.

I claim:

1. A fully synchronized individual direct drive apparatus which accomplishes an entirely controlled reciprocal movement cycle for each individual associated pattern bar of a Warp Knitting Machine in accordance with and in conformity with the movement requirements needed for the generation of any specifically desired cloth pattern, said pattern being developed by means of an individual direct drive which couples each controllable mechanical power source to its individually controlled associated pattern bar, said fully synchronized individual direct drive apparatus moving its individual associated pattern bar in controlled scynchronization with all other moving members of said Warp Knitting Machine, including other individually controlled associated pattern bars, said fully synchronized individual direct drive apparatus for each individually controlled associated pattern bar comprising: a control means comprising a computer which is programmed to prescribe the movements of each individually controlled associated pattern bar, said prescribed movements being accomplished by controlling the rotation of the controllable mechanical power source, where the clockwise and counter-clockwise rotation of the controllable mechanical power source is converted into the reciprocating movements of each said individually controlled associated pattern bar and where the coupling means is accomplished by means of a ball screw and ball nut, said ball screw being mounted on the individually controlled associated pattern bar which is threadably connected to a threaded shaft rotated by the controllable mechanical power source, and where the controlled reciprocal movement cycle as aforesaid is made in controlled synchronization with all other moving members of said warp knitting machine, said synchronization being accomplished through sensors which locate the position of each moving member aforesaid relative to each other by means of said computer whereby the computer is able to effect said synchronization; a controllable mechanical power source; and a direct coupling means by which said power source is directly and fully coupled to its individually controlled associated pattern bar during a full reciprocal cycle.

2. A controlled individual direct drive apparatus as claimed in claim 1 where the sensors are optical discs mounted on the shafts of the controllable mechanical power source.

3. A controlled individual direct drive apparatus as claimed in claim 1 where the individual associated pattern bar is constructed of magnesium.

4. A controlled individual direct drive apparatus as claimed in claim 1 where the controllable mechanical power source is stepping motor.

5. A controlled individual direct drive apparatus as claimed in claim 1 where the controllable mechanical power source is a Servo-Motor.

6. A fully synchronized knitting machine as described in claim 1 wherein the driving mechanisms' power source is either one or two heavy-duty motors operating in a uni-direction where the reciprocal movement is produced by the use of magnetic clutches and rotation reversal on the threaded rods.

7. A knitting machine as described in claim 1 wherein an additional patterning element is introduced by varying the speed of the drive motors and the resulting speed of the patterning bars.

8. A fully synchronized individual direct drive apparatus which accomplishes an entirely controlled reciprocal movement cycle for each individual associated pattern bar of a Warp Knitting Machine in accordance with and in conformity with the movement requirements needed for the generation of any specifically desired cloth pattern, said pattern being developed by means of an individual direct drive which couples each controllable mechanical power source to its individually controlled associated pattern bar, said fully synchronized individual direct drive apparatus moving its individual associated pattern bar in controlled synchronization with all other moving members of said Warp Knitting Machine, including other individually controlled associated pattern bars, said fully synchronized individual direct drive apparatus for each individually controlled associated pattern bar comprising: a control means comprising a computer which is programmed to prescribe the movements of each individually controlled associated pattern bar, said prescribed movements being accomplished by controlling the rotation of the controllable mechanical power source, where the clockwise and counter-clockwise rotation of the controllable mechanical power source is converted into the reciprocating movements of each said individually controlled associated pattern bars and where the coupling means is accomplished by means of threadably mounted Moglese threaded Acme nut and head screw, said Acme nut and head screw being mounted on the individually controlled associated pattern bar which is threadably connected to a threaded shaft rotated by the controllable mechanical power source, and where the controlled reciprocal movement cycle as aforesaid is made in controlled synchronization with all other moving members of said Warp Knitting Machine, said synchronization being acomplished through sensors which locate the position of each moving member aforesaid relative to each other by means of said computer whereby the computer is able to effect said synchronization; a controllable mechanical power source; and a direct coupling means by which said power source is directly and fully coupled to its individually controlled associated pattern bar during a full reciprocal cycle.

9. A controlled individual direct drive apparatus as claimed in claim 8 where the sensors are optical discs mounted on the shafts on the controllable mechanical power source.

10. A controlled individual direct drive apparatus as claimed in claim 8 where the individual associated pattern bar is constructed of magnesium.

11. A controlled individual direct drive apparatus as claimed in claim 8 where the controllable mechanical power source is a stepping motor.

12. A controlled individual direct drive apparatus as claimed in claim 8 where the controllable mechanical power source is a Servo-Motor.

13. A fully synchronized knitting machine as described in claim 8 wherein the driving mechanisms' power source is either one of two heavy-duty motors operating in a uni-direction where the reciprocal movement is produced by the use of magnetic clutches and rotation reversal on the threaded rods.

14. A knitting machine as described in claim 8 wherein an additional patterning element is introduced by varying the speed of the drive motors and the resulting speed of the patterning bars.

* * * * *